United States Patent
Sang et al.

(10) Patent No.: US 11,310,573 B2
(45) Date of Patent: Apr. 19, 2022

(54) LINE CARD AND DESIGN METHOD THEREFOR, COMMUNICATION CONTROL METHOD AND DEVICE, AND STORAGE MEDIUM

(71) Applicant: ZTE Corporation, Shenzhen (CN)

(72) Inventors: Yanning Sang, Shenzhen (CN); Quanyi Qiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/261,809

(22) PCT Filed: Jul. 26, 2019

(86) PCT No.: PCT/CN2019/097889
§ 371 (c)(1),
(2) Date: Jan. 20, 2021

(87) PCT Pub. No.: WO2020/020339
PCT Pub. Date: Jan. 30, 2020

(65) Prior Publication Data
US 2021/0281933 A1   Sep. 9, 2021

(30) Foreign Application Priority Data
Jul. 27, 2018   (CN) .......................... 201810843414.9

(51) Int. Cl.
*H04Q 11/00* (2006.01)
*H04J 14/00* (2006.01)

(52) U.S. Cl.
CPC .......... *H04Q 11/0067* (2013.01); *H04J 14/00* (2013.01); *H04J 2203/0051* (2013.01)

(58) Field of Classification Search
CPC ................................................. H04Q 11/0067
See application file for complete search history.

(56) References Cited

U.S. PATENT DOCUMENTS

2006/0275036 A1* 12/2006 Hochbaum ........ H04Q 11/0067
398/67
2007/0116466 A1*  5/2007 Gewirtzman ......... H04J 3/1694
398/71
(Continued)

FOREIGN PATENT DOCUMENTS

CN         101877798 A      11/2010
CN         102201862 A       9/2011
(Continued)

OTHER PUBLICATIONS

The State Intellectual Property Office of People's Republic of China. First Office Action for CN Application No. 201810843414.9 and English translation, dated Aug. 18, 2021, pp. 1-8.
(Continued)

*Primary Examiner* — Nathan M Cors
(74) *Attorney, Agent, or Firm* — Vivacqua Crane PLLC

(57) ABSTRACT

A line card and a design method thereof, a communication control method and device, and a storage medium are disclosed. The method includes: configuring a plurality of functions of a plurality of pins in the line card according to a new standard signal definition table obtained by classifying a first standard signal definition table corresponding to a 10G EPON and a second standard signal definition table corresponding to an xGPON.

3 Claims, 6 Drawing Sheets

(56) References Cited

U.S. PATENT DOCUMENTS

| | | | |
|---|---|---|---|
| 2008/0002976 A1* | 1/2008 | Tal | H04J 3/1694 |
| | | | 398/58 |
| 2009/0208210 A1 | 8/2009 | Trojer et al. | |
| 2011/0268443 A1 | 11/2011 | Adler | |
| 2011/0317995 A1* | 12/2011 | Zheng | H04Q 11/0067 |
| | | | 398/2 |

FOREIGN PATENT DOCUMENTS

| | | | | |
|---|---|---|---|---|
| CN | 102595258 A | | 7/2012 | |
| CN | 104468576 A | | 3/2015 | |
| CN | 105263071 | * | 1/2016 | H04Q 11/00 |
| CN | 105263071 A | | 1/2016 | |
| CN | 202818302 | | 8/2016 | |
| CN | 106953696 A | | 7/2017 | |
| CN | 206759460 U | | 12/2017 | |
| CN | 108540231 A | | 9/2018 | |
| WO | 2013062452 A1 | | 5/2013 | |

OTHER PUBLICATIONS

The State Intellectual Property Office of People's Republic of China. First Search Report for CN Application No. 201810843414 and English translation, dated Aug. 12, 2021, pp. 1-8.

European Patent Office. Extended European Search Report for EP Application No. 19841971.5, dated Aug. 3, 2021, pp. 1-11.

International Search Report and Written Opinion for the International Patent Application No. PCT/CN2019/097889 dated Oct. 8, 2019.

Intellectual Property India, Examination Report for IN Application No. 202127005310 and English translation, dated Jan. 14, 2022, pp. 1-7.

Al-Quzwini, M. "Design and implementation of a Fiber to the Home FTTH Access Network based on GPON," International Journal of Computer Applications, vol. 92, No. 6, issued Apr. 2014, pp. 1-13.

* cited by examiner

LINE CARD AND DESIGN METHOD THEREFOR, COMMUNICATION CONTROL METHOD AND DEVICE, AND STORAGE MEDIUM

CROSS-REFERENCE TO RELATED APPLICATION

This application is a national stage filing under 35 U.S.C. § 371 of international application number PCT/CN2019/097889, filed Jul. 26, 2019, which claims priority to Chinese patent application No. 201810843414.9, filed Jul. 27, 2018. The contents of these applications are incorporated herein by reference in their entirety.

TECHNICAL FIELD

The present application relates to the field of communication, and more particularly, to a line card and a design method thereof, a communication control method and device, and a storage medium.

BACKGROUND

Optical fiber access is a general trend in the development of global access networks, and Passive Optical Network (PON) technology is the main means of optical fiber access. In recent years, with the rapid development of broadband Internet technology and broadband-related services, broadband users have gradually developed from a single application of broadband Internet access to integrated service applications such as High Definition Television (HDTV), Video on Demand (VOD) and High-Speed Internet Access (HSIA). Optical access networks are developing towards higher transmission rates, longer transmission distances, higher splitting ratios and more access wavelengths. At present, Ethernet Passive Optical Network (EPON) and Gigabit Passive Optical Network (GPON) are two main members of optical network access PON.

EPON technology based on IEEE 802.3ah is widely supported because it is compatible with the widely deployed Ethernet LAN and hundreds of millions of terminal Ethernet interface standards. EPON technology is a point-to-multipoint transmission technology formed by a combination of PON and Ethernet protocols and adopts a standard Ethernet frame structure.

GPON technology based on G.984.x standard adopts a brand-new GPON transmission convergence layer (GFC), which allows any service to be transmitted through a GPON Encapsulation Mode (GEM). The physical layer may enable higher transmission rates (up to 2.5 Gb/s), longer transmission distances (up to 60 km theoretically), and higher splitting ratios (supporting 1:64), and may also provide more powerful Quadrature Amplitude Modulation (QAM) and Quality of Service (QoS) functions.

Technologies such as a 10G Ethernet passive optical network (10G EPON) and a 10-Gigabit-capable Passive Optical Network (xGPON), which are further developed from EPON and GPON, may better meet the growth of users' bandwidth demand and the requirement of operators to lower the cost of bandwidth per megabit. It is an ideal upgrading technology for Fiber To The Building (FTTB) and Fiber To The Curb (FTTC), and greatly improves the application of information technology in various industries such as broadcasting and TV, power and oil.

The 10G EPON and xGPON follow different standards. The xGPON has more variations in applications, including asymmetric XGPON1, symmetric XGSPON and Combo XGPON, so it is superior to the 10G EPON in terms of performance indicators, but the 10G EPON is superior in terms of time and cost. The xGPON is better suited to customers with higher requirements on bandwidth, multi-service, QoS and security as well as those using Asynchronous Transfer Mode (ATM) technology as a backbone network. The 10G EPON is mainly used for cost-sensitive customers with lower requirements on low QoS and security. In the future broadband access market, the two technologies should compete with each other, complement each other and learn from each other. At present, the 10G EPON and xGPON technologies are performed by using independent and separate hardware structures, and there is no way to achieve mutual compatibility. Therefore, to ensure that Optical Line Terminal (OLT) equipment may freely and flexibly select different PON technologies for data transmission in different applications in the future, it is urgent to design a line card which may be compatible with the 10G EPON and xGPON optical modules simultaneously.

SUMMARY

The following is a summary of subject matters described in detail herein. This summary is not intended to limit the protection scope defined by the claims.

Embodiments of the present application provide a line card and a design method thereof, a communication control method and device, and a storage medium.

According to some embodiments of the present disclosure, a design method of a line card applied to enable the line card to be compatible with a 10G Ethernet Passive Optical Network (10G EPON) and a 10-Gigabit-capable Passive Optical Network (xGPON) is provided, the method includes: acquiring a first standard signal definition table for a plurality of pins in an optical module corresponding to the 10G EPON and a second standard signal definition table for a plurality of pins in an optical module corresponding to the xGPON; classifying the first standard signal definition table and the second standard signal definition table according to a plurality of functions of the plurality of pins, generating a new standard signal definition table; and configuring the plurality of functions of the plurality of pins in the line card based on the new standard signal definition table.

According to some embodiments of the present disclosure, a line card applied to perform compatible communication between a 10G Ethernet Passive Optical Network (10G EPON) and a 10-Gigabit-capable Passive Optical Network (xGPON) is provided, which includes a processor, an optical network processing unit and at least one hop-selecting unit; the processor is configured to: acquire a first standard signal definition table for a plurality of pins in an optical module corresponding to the 10G EPON and a second standard signal definition table for a plurality of pins in an optical module corresponding to the xGPON; classify the first standard signal definition table and the second standard signal definition table according to a plurality of functions of the plurality of pins, generate a new standard signal definition table; and configure the plurality of functions of the plurality of pins of the optical network processing unit based on the new standard signal definition table; the optical network processing unit is provided with a plurality of pins and configured to transmit an optical network signal; and the hop-selecting unit is configured to control the plurality of pins of the optical network processing unit to output the optical network signal corresponding to the 10G EPON or the optical network signal corresponding to the xGPON according to the type of optical network signal received.

According to some embodiments of the present disclosure, a communication control method of a line card is provided, which includes: acquiring a first standard signal definition table for a plurality of pins in an optical module corresponding to a 10G Ethernet Passive Optical Network (10G EPON) and a second standard signal definition table for a plurality of pins in an optical module corresponding to a 10-Gigabit-capable Passive Optical Network (xGPON); classifying the first standard signal definition table and the second standard signal definition table according to a plurality of functions of the plurality of pins, and generating a new standard signal definition table; and configuring the plurality of functions of the plurality of pins in the line card based on the new standard signal definition table; collecting an optical network signal to be input into an optical network processing unit in the line card as well as a switch gating signal corresponding to the optical network signal; and controlling a hop-selecting unit in the line card to gate a pin corresponding to the optical network signal according to the switch gating signal, and outputting the optical network signal to an optical module corresponding to the optical network signal.

According to some embodiments of the present disclosure, a communication device is provided, which includes a master control module, a 10G Ethernet Passive Optical Network (10G EPON) optical module, a 10-Gigabit-capable Passive Optical Network (xGPON) optical module, and the line card described above, a plurality of output terminals of the line card are connected to the 10G EPON optical module and the xGPON optical module, respectively; the master control module is configured to: acquire a first standard signal definition table for a plurality of pins in the 10G EPON optical module and a second standard signal definition table for a plurality of pins in the xGPON optical module; classify the first standard signal definition table and the second standard signal definition table according to a plurality of functions of the plurality of pins, generate a new standard signal definition table; and configure the plurality of functions of the plurality of pins of the optical network processing unit in the line card based on the new standard signal definition table; the master control module is also configured to collect an optical network signal to be input into the line card as well as a switch gating signal corresponding to the optical network signal; and a hop-selecting unit in the line card is configured to gate a plurality of pins corresponding to the optical network signal according to the switch gating signal, and output the optical network signal to the 10G EPON optical module or the xGPON optical module for processing.

According to some embodiments of the present disclosure, a communication device is provided, which includes: a processor, a memory, and a communication bus; the communication bus is configured to perform a communication connection between the processor and the memory; the processor is configured to execute at least one first program stored in the memory to perform the design method of the line card described above; or the processor is configured to execute at least one second program stored in the memory to perform the communication control method of the line card described above.

According to some embodiments of the present disclosure, a non-transitory computer-readable storage medium is provided, the non-transitory computer-readable storage medium storing one or more first programs which, when executed by at least one processor, cause the at least one processor to execute the design method of the line card described above; or the non-transitory computer-readable storage medium storing at least one second program which, when executed by at least one processor, cause the at least one processor to execute the communication control method of the line card described above.

After reading and understanding the drawings and detailed description, other aspects can be understood.

DETAILED DESCRIPTION

Embodiments of the present application will be further described in detail below with reference to the accompanying drawings by the exemplary embodiments. It should be understood that the exemplary embodiments described herein are only for explaining the present application, rather than limiting the present application.

Embodiment One

The existing module design of 10G EPON and xGPON optical networks only allows an independent circuit structure layout which is relatively complex in structure and is inconvenient for integration and miniaturization, resulting in high manufacturing cost and inconvenient application, this embodiment provides a design method which may enable an OLT line card to be compatible with both 10G EPON and xGPON optical modules, including following steps of classifying standard signal definition tables of the 10GEPON and xGPON XFP optical modules to define a new integrated signal definition table compatible with various xPON technologies for a plurality of pins in the XFP optical modules, and defining all pins in the line card according to the new signal definition of the pins, so that the line card may be compatible with the 10GEPON and xGPON optical networks simultaneously, thereby making it more flexible and convenient for users to select optical networks in the process of using the line card defined in this way for communication, easily meeting the needs of practical applications, and simplifying the hardware design of the line card.

Figure 1:
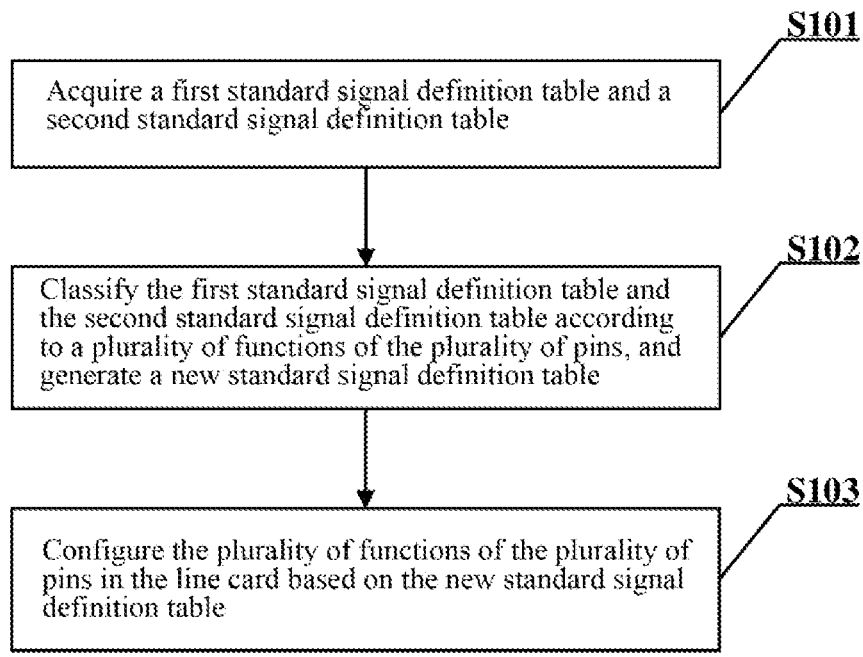
FIG. 1 is a flowchart of a design method of a line card according to embodiment one of the present application.

As shown in FIG. 1, this embodiment provides a design method of a line card, including following steps of S101, S102 and S103.

At S101, a first standard signal definition table and a second standard signal definition table are acquired.

In this embodiment, the first standard signal definition table refers to the standard signal definition table for a plurality of pins in the 10G EPON optical module, and the second standard signal definition table refers to the standard signal definition table for a plurality of pins in the xGPON optical module. For example, the two standard signal definition tables are derived from the signal definitions of the pins in data sheets of a 10G EPON asymmetric 10 Gigabit Small Form Factor Pluggable (XFP) optical module, an XG-PON1 asymmetric XFP optical module, an XGSPON symmetric XFP optical module and a Combo XGPON XFP optical module.

In practice, in addition to the standard signal definition tables for the pins in the 10GEPON and xGPON optical modules, signal definition tables for other types of modules similar to 10GEPON and xGPON may also be acquired in this step.

At S102, the first standard signal definition table and the second standard signal definition table are classified according to a plurality of functions of the plurality of pins, and a new standard signal definition table is generated.

In this embodiment, it should be understood that the new standard signal definition table herein is a new integrated signal definition table for the pins in an XFP optical module, which is compatible with various xPON technologies, and summarized and defined by classifying the standard signal definition table of an xGPON XFP optical module, for example, by analyzing and summarizing the signal definitions for the plurality of pins in the data sheets of the 10G EPON asymmetric XFP optical module, XG-PON1 asymmetric XFP optical module, XGSPON symmetric XFP optical module and Combo XGPON XFP optical module.

In practice, the new standard signal definition table is acquired by comparing the differences of signal definitions for various optical modules, and enumerating the signals for the pins with the same serial number and different functions for comparison. The design idea of the new standard signal definition table is mainly performed in following four cases.

1. In response to the exactly same signal definitions for the pins with the same serial number in the two optical modules, the new definition will continue to be used. Assuming that the signal definitions of the pins 1, 5, 6 and 7 in the 10GEPON optical module are the same as those in the xGPON optical module, the signal definitions for the pins 1, 5, 6 and 7 shall be retained in the signal definitions.

2. In response to one of the optical modules being a NC dangling pin, the circuit wiring may be designed with reference to the signal definitions for the other optical module, without affecting each other. In response to the pins 13, 22, 24, 25 and 26 in the 10G EPON optical module being the NC dangling pins, while the pins 13, 22, 24, 25 and 26 in the xGPON optical module being not NC dangling pins, a new signal definition table shall be generated with reference to the definitions of the pins 13, 22, 24, 25 and 26 in the XGPON optical module.

3. The 10G EPON and xGPON optical modules have different signal names which make no difference in their use. For example, the signal definitions of the pins 14 (RX_LOS/RX_BSD) in the 10G EPON and xGPON optical modules do not affect each other in use. In this case, a new definition table shall be generated by integrating the definitions directly.

4. In response to the same pins in the two optical modules having inconsistent signal definitions for enabling different functions, the connection shall be made by hop-selecting for flexible replacement in practice. For example, the pins 2, 3 and 4 in the two optical modules have completely different signal definitions which make a difference in their use. In this case, a new signal definition table shall be generated by integrating the different signal definitions and further by providing a hop-selecting control unit at an output terminal of each pin to selectively output the signal definitions.

In the fourth case, it is needed to perform signal multiplexing in the new pin definition, i.e., it is needed to configure a hop-selecting connection in the line card design to implement compatibility with the optical modules. By such design, the user may output the signal definitions freely according to the type of optical networks currently used, thus achieving the flexible control of the signals.

At S103, the plurality of functions of the plurality of pins in the line card are configured based on the new standard signal definition table.

In this embodiment, in response to the classification of the two standard signal definition tables in the step S102, it is possible to classify the two types of pins, for example, by comparing the definitions of all the pins in the first standard signal definition table and the second standard signal definition table through a one-to-one correspondence of serial numbers of the pins.

The pins have the same serial number and same function or the pins have the same serial number and corresponding functions not affecting each other are classified as a first type of pin having a single function definition.

The pins have the same serial number and different functions affecting each other as a second type of pin having at least two function definitions.

In practice, the first type of pins may also be divided into two types, where the first type of pins are pins with exactly the same function, such as the pins 1 and 6 both defined as GND and VCC5, and the second type of pins are pins with functions not affecting each other. For example, the pins 13 and 14 have different function definitions in the two optical modules, which make no difference in their use, so such pins are also classified into one type.

In this embodiment, to accurately select the signal definition of the second type of pins, it is also needed to define a function-selecting signal definition in this method. The function-selecting signal definition is configured to selectively output an optical network signal corresponding to the 10G EPON or an optical network signal corresponding to the xGPON, and add the function-selecting signal definition to the new standard signal definition table.

In response to 30 pins in the both optical modules of the 10G EPON and the xGPON, for example, the pins 2 to 4, 20, 21 and 23 of the 30 pins are defined as the second type of pins according to the pin classification results in comparison analysis, pins other than those defined as the second type pins are defined as the first type of pins, and the signal gating pin is defined according to the function-selecting signal definition.

In practice, the pins 2 to 4, 20, 21 and 23 may be controlled to output signals by controlling the gating of the defined signal gating pin. For example, a high level is to selectively output a signal definition corresponding to the 10G EPON, and a low level is to selectively output a signal definition corresponding to the xGPON.

In this embodiment, the signal definitions for the second type of pins may be selected by configuring a hop-selecting connection, and the connection may be made by using a three-terminal hop-selecting resistor, and may also be made by a selector switch chip in response to the conditional layout of the line card.

For the connection by using the three-terminal hop-selecting resistor, two encapsulated 0402 resistors of 0 ohm share one pad and are placed vertically on a Printed Circuit Board (PCB). In practice, only one resistor is welded, and the other resistor is not welded.

The selector switch chip may be one 12-way switch chip, two 6-way switch chips or three 4-way switch chips. Two adjacent input ports are connected to two function pins of PON MAC or GND, one way after being selected to output is connected to the pins of the PCB XFP optical module, and a selection configuration pin of the selector switch chip is connected to a CPU or a CPLD. The input selection of the switch chip may be switched by software commands to implement compatibility of different types of optical modules.

Compared with related technologies, the design method of the line card provided by this embodiment integrates the 10G EPON and xGPON optical modules in the same line card, thus enabling the line card to be compatible with the two optical networks. Through such definitions, the corresponding line card structure and circuit design are reduced by half, thereby greatly simplifying the hardware development and design, reducing the investment cost of equipment, and flexibly meeting the actual use requirements.

Embodiment Two

A pin definition method of a line card provided by this embodiment of the present application will be described in detail with its application. There are 30 pins in the line card, where the unused pins are represented by NC, and other pins are represented by output signals. In this embodiment, standard signal definitions for four optical modules, i.e., 10G EPON, XGPON-1, XGSPON and Combo XGPON, are selected to generate a new standard signal definition table. The new standard signal definition table is compatible with the signal definitions of the 10G EPON, XGPON-1, XGSPON and Combo XGPON, as shown in Table 1 below:

TABLE 1

Signal Definitions of Pins in 10G EPON, xGPON and New Definition Combo XFP Optical Modules

| PIN | 10GEPON | Asymmetric XGPON1 | Symmetric XGS-PON | GPON-XGPON 1 Combo | New Definition Combo XFP |
|---|---|---|---|---|---|
| 1 | GND | GND | GND | GND | GND |
| 2 | TX_1G+ | NC | TX_FAULT | TX_FAULT | EPON_TX_1G+/TX_FAULT[1] |
| 3 | TX_1G- | NC | NA | GPON_TX+ | EPON_TX_1G-/GPON_2.5G_TX+[2] |
| 4 | GND | NC | NA | GPON_TX- | GND/GPON_2.5G_TX-[3] |
| 5 | TX_DIS | TX_DIS | TX_DIS | TX_DIS | TX_DIS |
| 6 | VCC5 | VCC5 | VCC5 | VCC5 | VCC5 |
| 7 | GND | GND | GND | GND | GND |
| 8 | VCC3 | VCC3 | VCC3_TX | VCC3 | VCC3 |
| 9 | VCC3 | VCC3 | VCC3_RX | VCC3 | VCC3 |
| 10 | SCL | SCL | SCL | SCL | SCL |
| 11 | SDA | SDA | SDA | SDA | SDA |
| 12 | MOD_ABS | MOD_ABS | MOD_ABS | MOD_ABS | MOD_ABS |
| 13 | NC | Rx_Reset | XGS_RST | XGPON_RST | XGPON_RST[4] |
| 14 | RX_LOS | RX_BSD | XGS_BSD | XGPON_BSD | EPON_RX_LOS/XGPON_BSD[5] |
| 15 | GND | GND | RateSel | GND | GND[6] |
| 16 | GND | GND | GND | GND | GND |
| 17 | RX_10G- | RD_2.5G- | XGS_RD1- (XGS) | XGPON_RX- | EPON_RX_10G-/XGPON_RX_10G&2.5G-[7] |
| 18 | RX_10G+ | RD_2.5G+ | XGS_RD1+ (XGS) | XGPON_RX+ | EPON_RX_10G+/XGPON_RX_10G&2.5G+[8] |
| 19 | GND | GND | GND | GND | GND |
| 20 | RX_1G- | NC | NA | GPON_BSD | EPON_RX_1G-/GPON_BSD[9] |
| 21 | RX_1G+ | RX_RSSI_TRIG | RX_RSSI_TRIG | RX_RSSI_TRIG | EPON_RX_1G+/RX_RSSI_TRIG[10] |
| 22 | NC | NC | NA | GPON_RST | GPON_RST[11] |
| 23 | Rx_RSSI_TRIG | GND | GND | GND | Rx_RSSI_TRIG/GND[12] |
| 24 | NC | NC | XGS_RD2+ (XGPON1) | GPON_RX+ | XGPON_RX_2.5G+&GPON_RX_1G+[13] |
| 25 | NC | NC | XGS_RD2- (XGPON1) | GPON_RX- | XGPON_RX_2.5G-&GPON_RX_1G-[14] |
| 26 | NC | GND | GND | GND | GND |
| 27 | GND | GND | GND | GND | GND |
| 28 | TX_10G- | TD_10G- | XGS_TD- | XGPON_TX- | EPON_TX_10G-/XGPON_TX_10G-[15] |

TABLE 1-continued

Signal Definitions of Pins in 10G EPON, xGPON and New Definition Combo XFP Optical Modules

| PIN | 10GEPON | Asymmetric XGPON1 | Symmetric XGS-PON | GPON-XGPON 1 Combo | New Definition Combo XFP |
|---|---|---|---|---|---|
| 29 | TX_10G+ | TD_10G+ | XGS_TD+ | XGPON_TX+ | EPON_TX_10G+/ XGPON_TX_10G+[16] |
| 30 | GND | GND | GND | GND | GND |

Notes:
(1) 10G EPON downstream transports 1G data+/XGSPON&Combo PON sends a fault indication;
(2) 10G EPON downstream transports 1G data−/Combo GPON downstream transports 2.5G data+;
(3) 10G EPON GND/Combo GPON downstream transports 2.5G data+;
(4) XGPON&Combo XGPON reset;
(5) 10G EPON LOS indication/XGPON resets and indicates data burst;
(6) XGSPON rate selection, 0: low sending rate; 1: high sending rate;
(7) 10G EPON upstream transports 10G data−/10G&XGPON Combo XGPON upstream transports 2.5G data−;
(8) 10G EPON upstream transports 10G data+/10G&XGPON Combo XGPON upstream transports 2.5G data+;
(9) 10G EPON upstream transports 1G data−/Combo GPON indicates data burst;
(10) 10G EPON upstream transports 1G data +/XGPON upstream transports optical power and triggers reading;
(11) Combo GPON resets;
(12) 10G EPON upstream transportsoptical power and triggers reading/XGPON GND;
(13) XGSPON upstream transports 2.5G data+ & Combo GPON receives 1G data+;
(14) XGSPON upstream transports 2.5G data− & Combo GPON upstream transports 1G data−;
(15) 10G EPON downstream transports 10G data−/XGPON downstream transports 10G data & Combo XGPON transports 10G data−; and
(16) 10G EPON downstream transports 10G data+/XGPON downstream transports 10G data & Combo XGPON transports 10G data+.

The above table 1 includes the signal definitions for the original pins in the 10G EPON, XGPON-1, XGSPON and Combo XGPON XFP, as well as the signal definitions for the pins in the line card in this embodiment of the present application in the column "New Definition Combo XFP" on the right of Table, and the signal definitions for all pins in this column are obtained by performing comparative analysis on the signal definitions of the 10G EPON, XGPON-1, XGSPON and Combo XGPON. During the comparative analysis, it is found that the pins with different functions mainly include the pins 2, 3, 4, 13, 14, 20, 21, 22, 23, 24 and 25. Further comparison shows that the functions of the pins 2, 3, 4, 20, 21 and 23 have different signal definitions in each type of optical network, and the signal definitions are also used to enable different functions. The rest pins have different functions which make no difference in their use. Therefore, it is needed to set up a hop-selecting definition in response to redefining the pins 2, 3, 4, 20, 21 and 23. For example, hop-selecting may be performed by software or hardware. A table, which mainly screens out the pins with different functions for hop-selecting setup as shown in Table 2 below, is generated after the above comparative analysis:

TABLE 2

Signal Definition Table with 10G EPON and xGPON Compatible Design

| PIN | 10GEPON | xGPON | New Definition Combo | Remarks |
|---|---|---|---|---|
| 2 | TX_1G+ | TX_FAULT | EPON_TX_1G+/ TX_FAULT[1] | Hop-selecting |
| 3 | TX_1G− | GPON_TX+ | EPON_TX_1G−/GPON_2.5G_TX+[1] | Hop-selecting |
| 4 | GND | GPON_TX− | GND/GPON_2.5G_TX−[1] | Hop-selecting |
| 13 | NC | Rx_Reset | XGPON_RST | Not affect |
| 14 | RX_LOS | RX_BSD | EPON_RX_LOS/ XGPON_BSD | Not affect |
| 20 | RX_1G− | GPON_BSD | EPON_RX_1G−/GPON_BSD | Hop-selecting |
| 21 | RX_1G+ | RX_RSSI_TRIG | EPON_RX_1G+/ RX_RSSI_TRIG | Hop-selecting |
| 22 | NC | GPON_RST | GPON_RST | Not affect |
| 23 | Rx_RSSI_TRIG | GND | Rx_RSSI_TRIG/GND | Hop-selecting |
| 24 | NC | GPON_RX+ | XGPON_RX_2.5G+&GPON_RX_1G+ | Not affect |
| 25 | NC | GPON_RX− | XGPON_RX_2.5G−&GPON_RX_1G− | Not affect |

In the above Table 2, there are 11 pins with inconsistent signal definitions in the 10G EPON and xGPON optical modules screened out for comparison, where four pins in the 10G EPON optical module are NC dangling pins not needed to be used, while those in the xGPON should enable functions, so the four pins may be designed with reference to their usage in the xGPON. There is also one pin with different signal names RX_LOS/RX_BSD which make no difference to its use in the 10GEPON and the xGPON, so there is no need to pay attention to this pin. The remaining six pins (2, 3, 4, 20, 21 and 23) are significantly different in their use in the 10G EPON and xGPON. The pins 2 and 3 are a pair of differential lines in the 10G EPON, while the pins 3 and 4 are a pair of differential lines in the xGPON. Attention should be paid to ensuring the routing quality of differential lines in response to making hop-selecting connection.

In practice, the influence of impedance discontinuity on signal integrity may be reduced. For example, the three-terminal hop-selecting resistor may be adopted for control, which may ensure the routing quality and make the signal quality meet the requirements.

Figure 2:
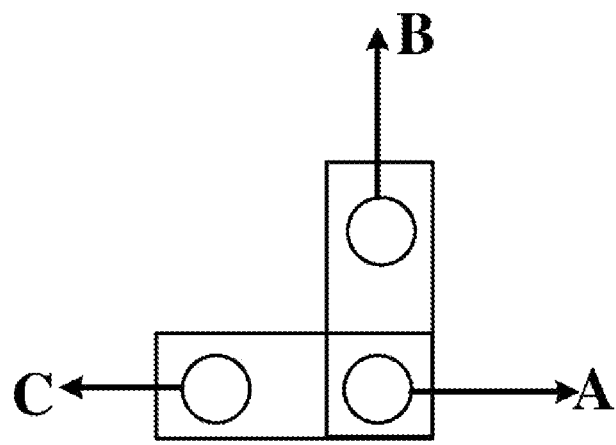
FIG. 2 is a schematic structure diagram of a three-terminal hop-selecting resistor with a 10GEPON and xGPON compatible design according to embodiment two of the present application.

In this embodiment, in response to enabling the control by connecting and configuring the three-terminal hop-selecting resistor, as shown in FIG. 2, two resistors shall be adopted, where A is a common pad of two 0402 resistors of 0 ohm, which is connected to a PCB pin pad of an XFP pin, and B and C are the other terminals of the two resistors, respectively, which are connected to corresponding function pins or a GND network of a PON MAC chip in the line card according to the signal definition table.

Figure 3:
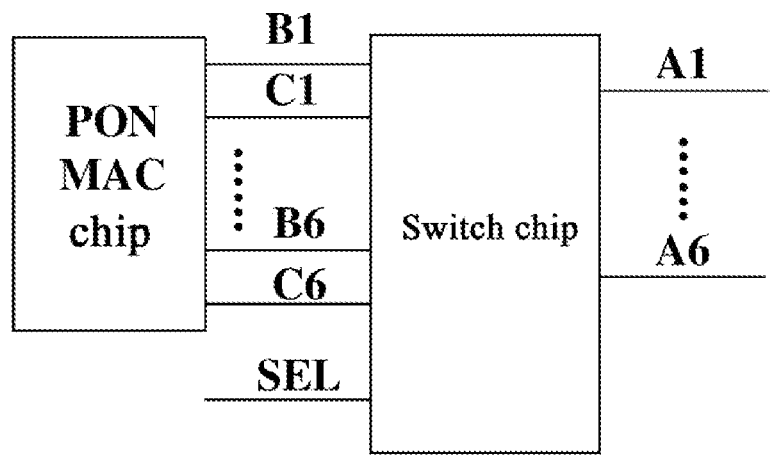
FIG. 3 is a schematic structure diagram of a line card with a selector switch chip design according to embodiment three of the present application.

In this embodiment, to control the selection, the hop-selecting signal may also be set by a switch chip, as shown in FIG. 3, where A is an output signal, which is connected to the PCB pin pad of the XFP pin, B and C are two input selection signals, and the input terminals of B and C are connected to corresponding PON MAC function pins or GND network respectively based on the signal definition table. An input terminal of SEL is connected to a Central Processing Unit/Processor (CPU) or Complex Programmable Logic Device (CPLD), and the signal output of the CPU or CPLD is used to select the input of the output signal from an output terminal of B or C, or to control the selection of the output signal from an output terminal of A.

Embodiment Three

Figure 4:
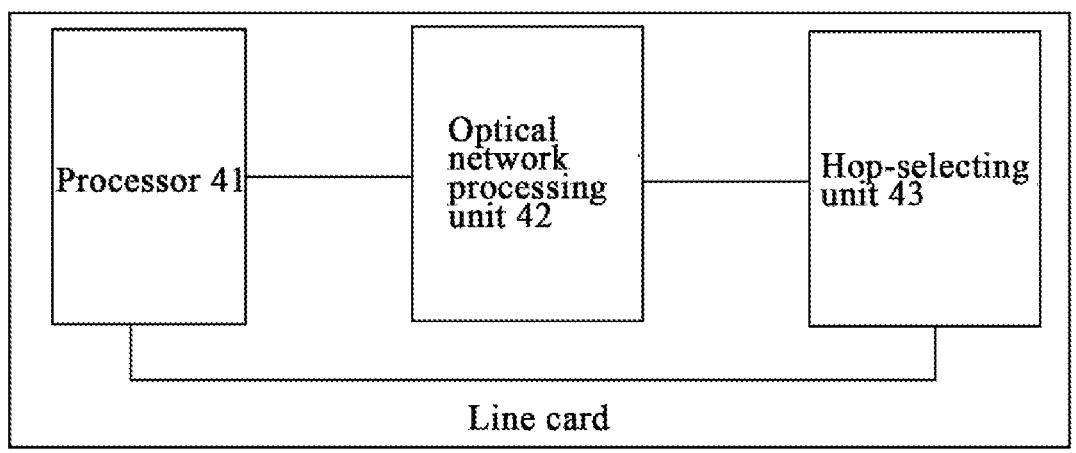
FIG. 4 is a schematic structure diagram of a line card according to embodiment three of the present application.

This embodiment provides a line card applied to perform compatible communication between a 10G Ethernet Passive Optical Network (10G EPON) and a 10-Gigabit-capable Passive Optical Network (xGPON), as shown in FIG. 4, the line card includes a processor 41, an optical network processing unit 42 and at least one hop-selecting unit 43.

The processor 41 is configured to acquire a first standard signal definition table for a plurality of pins in an optical module corresponding to the 10G EPON and a second standard signal definition table for a plurality of pins in an optical module corresponding to the xGPON; to classify the first standard signal definition table and the second standard signal definition table according to functions of the pins, and generate a new standard signal definition table; and to configure the functions of the pins of the optical network processing unit based on the new standard signal definition table. For example, the optical network processing unit 42 may be designed with a PON MAC chip in the related technologies.

The hop-selecting unit 43 is configured to control the pins of the optical network processing unit 42 to selectively output the optical network signals corresponding to the 10G EPON or the optical network signals corresponding to the xGPON according to the type of optical network signals received.

In this embodiment, in the process of classifying the first standard signal definition table and the second standard signal definition table, the processor 41 may compare the definitions for all the pins in the first standard signal definition table and the second standard signal definition table through a one-to-one correspondence of serial numbers of the pins.

The pins have the same serial number and same function or the pins have the same serial number and corresponding functions not affecting each other are classified as a first type of pin having a single function definition.

The pins have the same serial number and different functions not affecting each other as a second type of pin having at least two function definitions.

In practice, the first type of pins may also be divided into two type, where the first type of pins are pins with exactly the same function, such as the pins 1 and 6 both defined as GND and VCC5, and the second type of pins are pins with functions not affecting each other.

In this case, the optical network processing module 41 defines the corresponding signals for all the pins in the line card based on the classified definitions of the first type of pins and the second type of pins, such as corresponding signal definitions of pins in Table 1 above.

In practice, the hop-selecting unit 43 may be a module designed with a switch chip or with a three-terminal gating circuit consisting of three resistors, as shown in FIGS. 2 and 3.

Figure 5:
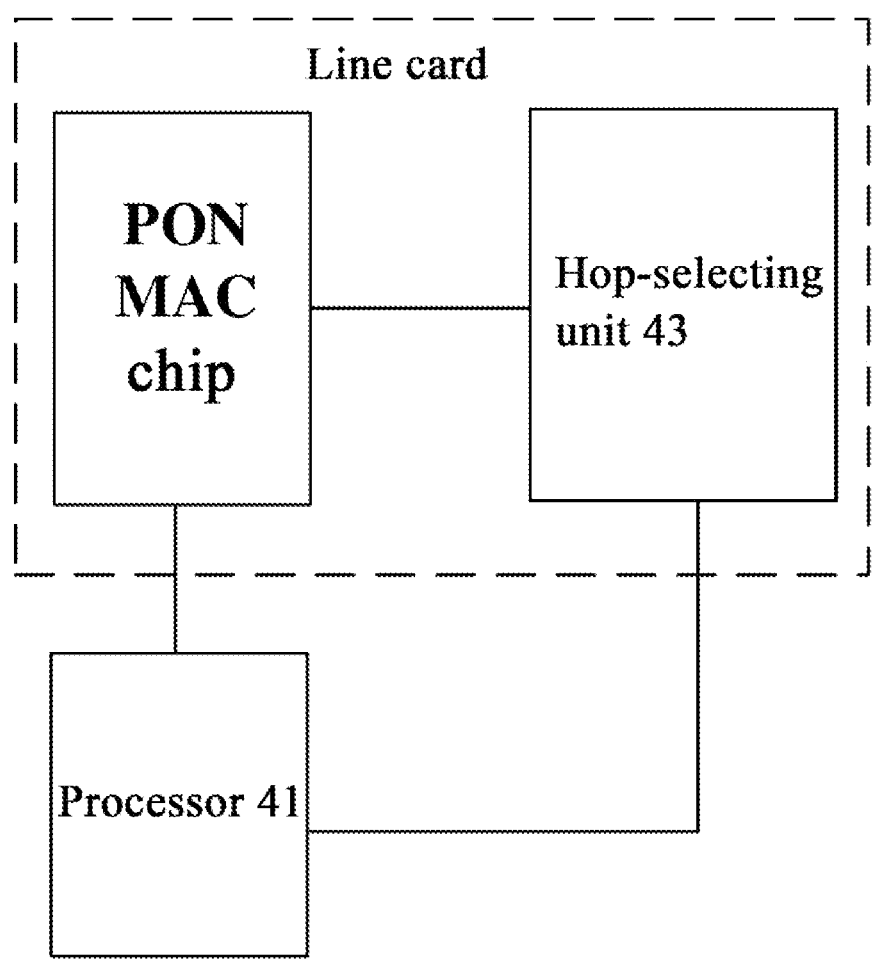
FIG. 5 is a schematic structure diagram of another line card according to embodiment three of the present application.

As shown in FIG. 5, in response to designing the optical network processing unit 42 with a PON MAC chip, the PON MAC chip may be provided with 30 pins in which the pins requiring a hop-selecting control are respectively connected to two sets of input terminals. Assuming that an input terminal of B is a 10G EPON signal and an input terminal of B is an xGPON signal, the two terminals are connected to a control pin SEL of the hop-selecting unit 43 through the processor 41. The hop-selecting unit 43 controls the selective input of the input signals of B or C according to the signals output by the processor 41, so that the signals of 10G EPON and xGPON may be freely selected, which makes the line card compatible with the two optical networks, and is convenient for the user to control selection.

In practice, the processor 41 may be configured not only by a controller on the line card, but also directly using a Central Processing Unit (CPU) in a communication terminal or communication system connected to the line card, i.e., the processor 41 here may also be a unit other than the line card.

Figure 6:
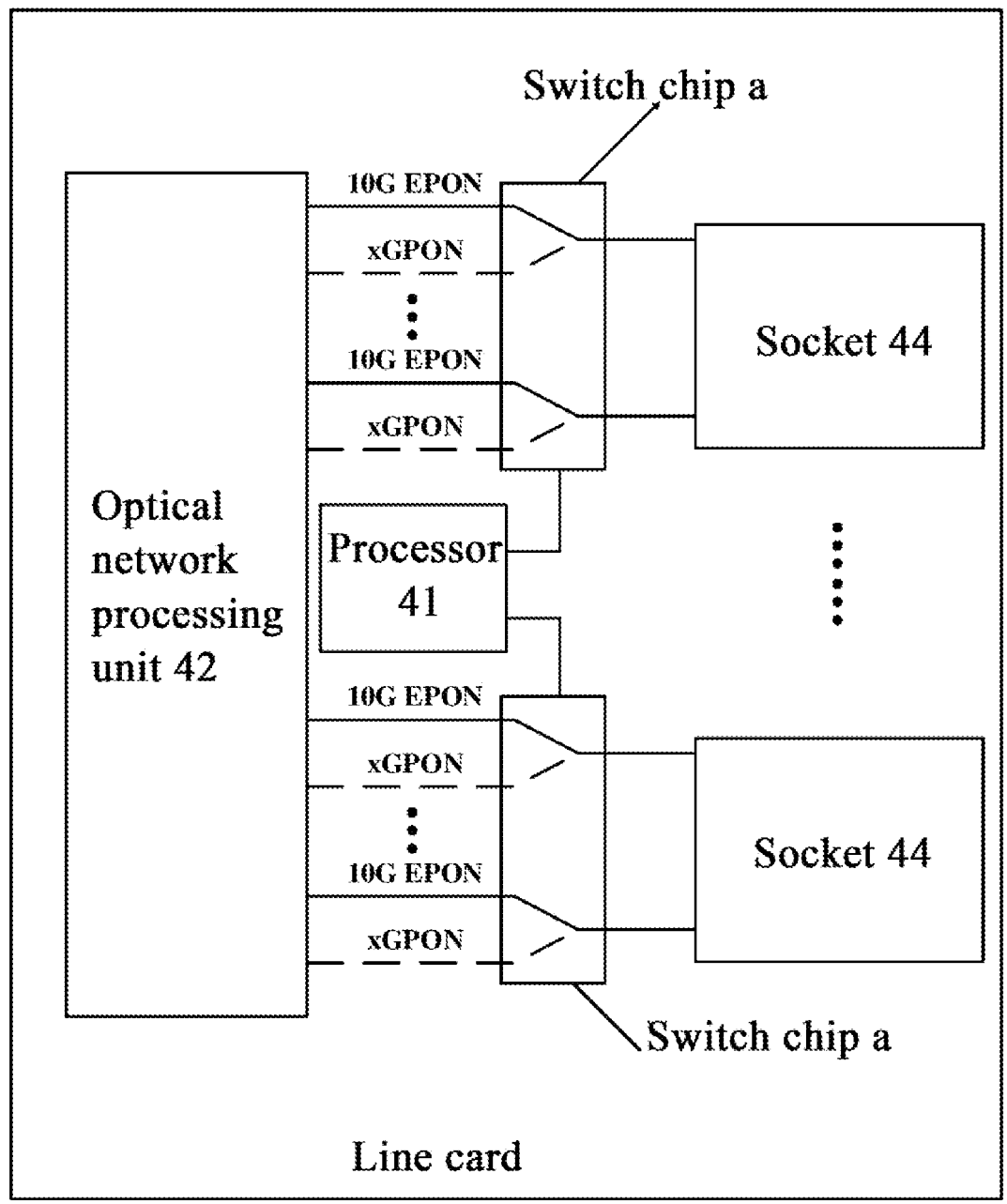
FIG. 6 is a schematic structure diagram of yet another line card according to embodiment three of the present application.

In this embodiment, to improve the integration level of the line card, the line card provided by this embodiment may also be provided with at least two 10GEPON outputs and at least two xGPON outputs, i.e., the line card may be configured to be compatible with a plurality of 10G EPON and xGPON optical modules simultaneously. As shown in FIG. 6, the PON MAC chip includes a plurality of sets of pins each redefined by the above pin definition method.

In this embodiment, the line card is also provided with a socket 44 for each set of pins, and the socket 44 is connected to an output terminal of the hop-selecting unit 43 and is configured to be connected to either the 10GEPON optical module or the xGPON optical module.

For example, in this embodiment, taking eight optical modules with serial numbers A to H as an example, there are six pins with multiplexed signals in each set of pins after using the above pin definition method. For example, a hop-selecting design is made with the switch chip, as shown in FIG. 6, the connection relation from the PON MAC chip to the pins of the optical module is that, after the pins in the PON MAC chip are defined by the new standard signal definition table, the six pins requiring signal multiplexing are connected to output terminals of a corresponding switch chip which are connected to the socket 44. Under the control of the processor 41, the switch chip a selects the corresponding output terminals for connection, so as to output corresponding optical network signals to the corresponding optical modules.

The line card provided by this embodiment may enable one line card to be compatible with the 10G EPON and xGPON optical network technologies simultaneously, thus greatly simplifying the hardware development and design, reducing the investment cost of equipment, and flexibly meeting the actual use requirements.

Embodiment Four

Figure 7:
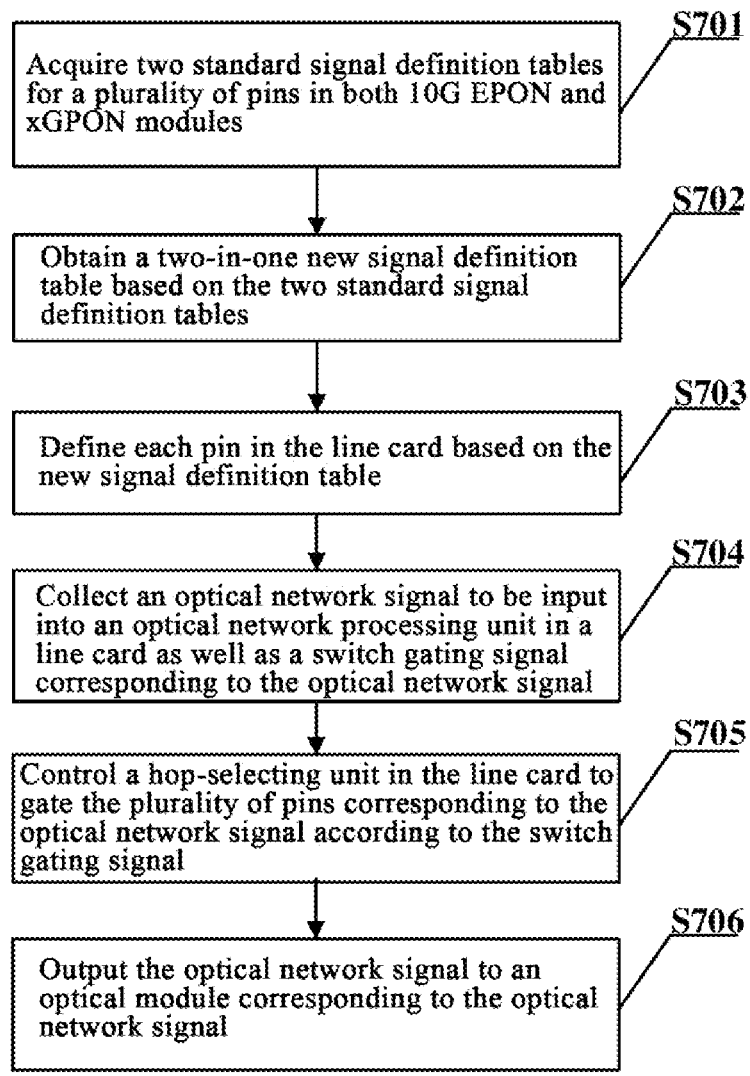
FIG. 7 is a flowchart of a communication control method of the line card according to embodiment four of the present application.

Based on the line card provided by the above embodiments, this embodiment of the present application further provides a communication control method of the line card, as shown in FIG. 7. Taking 10G EPON and xGPON optical networks as an example, the method includes following processing steps of S701, S702, S703, S704, S705 and S706.

At S701, standard signal definition tables for a plurality of pins in both 10G EPON and xGPON optical modules are acquired.

At S701, the standard signal definition tables of the plurality of pins obtained here are directly read from data sheets of the two optical modules in related technologies.

At S702, a two-in-one new signal definition table is obtained based on the two standard signal definition tables.

At S703, all pins in the line card are defined based on the new signal definition table.

In this embodiment, the pins are defined based on the definitions in Table 1. It is needed to set up a hop-selecting definition in response to redefining the pins 2, 3, 4, 20, 21 and 23, for example, by connecting and configuring a three-terminal hop-selecting resistor, as shown in FIG. 2, two resistors shall be adopted, where A is a common pad of two 0402 resistors of 0 ohm, which is connected to a PCB pin pad of an XFP pin, and B and C are the other terminals of the two resistors, respectively, which are connected to corresponding function pins or a GND network of a PON MAC chip in the line card according to the signal definition table.

The hop-selecting signal may also be set by a switch chip, as shown in FIG. 3. A is an output signal, which is connected to the PCB pin pad of the XFP pin, B and C are two input selection signals, and the input terminals of B and C are connected to corresponding PON MAC function pins or GND network respectively according to the signal definition table. An input terminal of SEL is connected to a Central Processing Unit/Processor (CPU) or Complex Programmable Logic Device (CPLD), and the signal output of the CPU or CPLD is used to select the input of the output signal from an output terminal of B or C, or to control the selection of the output signal from an output terminal of A.

At S704, an optical network signal to be input into an optical network processing unit in the line card as well as a switch gating signal corresponding to the optical network signal are collected.

At S705, a hop-selecting unit in the line card is controlled to gate a plurality of pins corresponding to the optical network signal according to the switch gating signal.

At S706, the optical network signal is output to an optical module corresponding to the optical network signal.

This communication control method implement the compatibility with both 10G EPON and xGPON, the switching between 10G EPON and xGPON and the control of signal selection at the same time, thus avoiding the situation in related technologies where the line card cannot be simultaneously compatible with 10G EPON and xGPON, Moreover, the method simplifies the hardware development and design, reduces the investment cost of equipment, and flexibly meets the actual use requirements.

Embodiment Five

Figure 8:
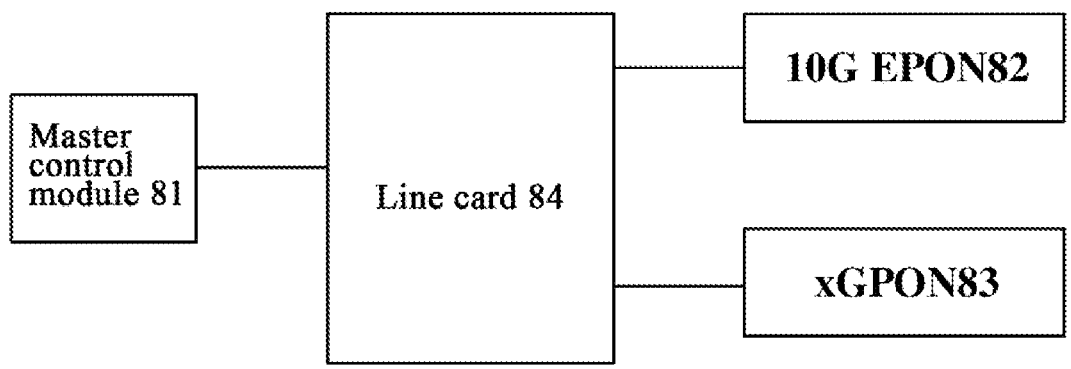
FIG. 8 is a schematic structure diagram of a communication device according to embodiment five of the present application.

This embodiment provides a communication device, as shown in FIG. 8, which includes a master control module 81, a 10G EPON optical module 82, an xGPON optical module 83 and a line card 84. Output terminals of the line card 84 are connected to the 10G EPON optical module 82 and the xGPON optical module 83, respectively.

In this embodiment, the master control module is configured to acquire a first standard signal definition table for a plurality of pins in the 10G EPON optical module and a second standard signal definition table for a plurality of pins in the xGPON optical module; to classify the first standard signal definition table and the second standard signal definition table according to functions of the pins, and generate a new standard signal definition table; and to configure the functions of the pins of the optical network processing unit in the line card based on the new standard signal definition table.

The master control module 81 is further configured to collect an optical network signal to be input into the line card 84 as well as a switch gating signal corresponding to the optical network signal.

A hop-selecting unit 43 in the line card 84 gates a plurality of pins corresponding to the optical network signal according to the switch gating signal, and outputs the optical network signal to the 10G EPON optical module 82 or the xGPON optical module 83 for processing.

In this embodiment, the line card 84 is compatible with a plurality of 10GEPON and xGPON optical modules, and its structure is as shown in FIG. 6. For example, the line card 84 includes eight sets of pins which may output signals of 10GEPON and xGPON, and the output terminals of each set of pins are connected to a switch chip a for gating control, while the 10GEPON optical module 82 and xGPON optical module 83 are respectively connected to the socket 43.

In this embodiment, a selector switch, which is configured to control and select the connection to the optical module corresponding to the type of signals output by the line card 84, may also be provided between the socket 44 and the 10G EPON optical module 82 and the xGPON optical module 83, thereby implementing the correspondence between different types of signals and the type of optical modules, and improving the signal processing efficiency.

Embodiment Six

Figure 9:
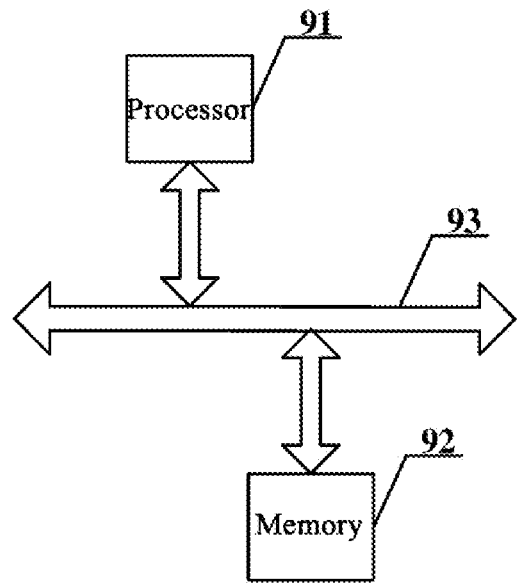
FIG. 9 is a schematic structure diagram of another communication device according to embodiment six of the present application.

This embodiment provides a communication device, as shown in FIG. 9, including a processor 91, a memory 92 and a communication bus 93.

The communication bus is configured to perform a communication connection between the processor 91 and the memory 92.

The processor 91 is configured to execute one or more first programs stored in the memory 92, so as to perform the steps of the design method of the line card in the above embodiments.

Alternatively, the processor 91 is configured to execute one or more second programs stored in the memory 92, so as to perform the steps of the communication control method of the line card in the above embodiments.

This embodiment further provides a non-transitory computer-readable storage medium. The non-transitory computer-readable storage medium stores one or more first programs which may be executed by one or more processors, so as to perform the steps of the design method of the line card in the above embodiments.

Alternatively, the non-transitory computer-readable storage medium stores one or more second programs which may be executed by one or more processors, so as to perform the steps of the communication control method of the line card in the above embodiments.

Figure 10:
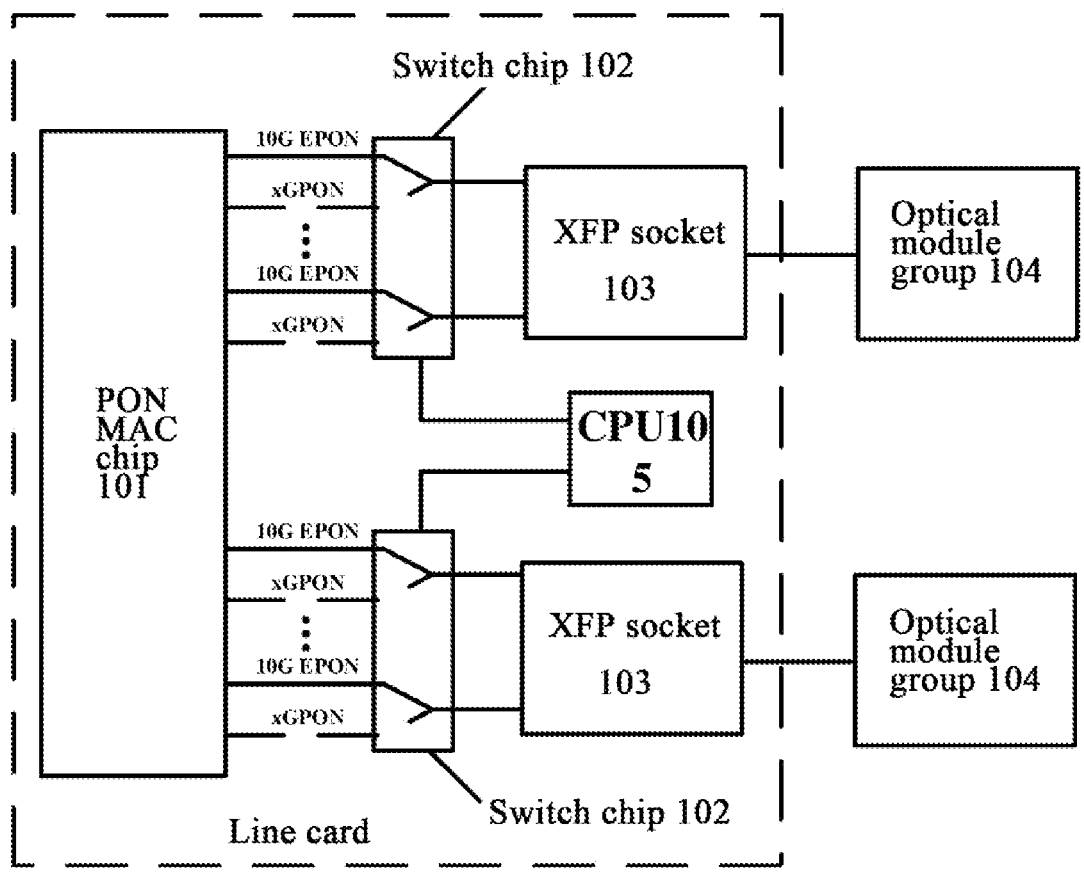
FIG. 10 is a schematic structure diagram of yet another communication device according to embodiment six of the present application.

For ease of understanding, this embodiment will be illustrated with an exemplary communication device. As shown in FIG. 10, the communication device in this embodiment includes a PON MAC chip 101, two switch chips 102, two XFP sockets 103, two optical module groups 104, and a CPU 105. Each optical module group 104 includes a 10GEPON optical module and an xGPON optical module, the PON MAC chip 101 includes two sets of pins, and functions of each set of pins are defined by the above method.

The CPU 105 controls the gating of the two switch chips 102 to control the connection of each sets of pins in the PON MAC chip 101, so as to control whether a 10GEPON signal or an xGPON signal is output from the PON MAC chip 101, and then output to the corresponding optical module in the optical module group 104 through the XFP socket 103 for signal processing.

To sum up, the line card and pin definition method thereof, the communication control method and device, and the storage medium provided by the embodiments of the present application define the functions of the pins in the line card using the new standard signal definition table obtained by performing comparative analysis on the first standard signal definition table corresponding to the 10G EPON and the second standard signal definition table corresponding to the xGPON, so that one cable card may be compatible with the 10G EPON and xGPON simultaneously to enable users to flexibly select appropriate operating optical network modes according to the actual network needs in use, thereby meeting the actual application requirements, simplifying the hardware design of the line card and reducing the investment cost of equipment at the same time.

Those of ordinary skill in the art will appreciate that all or some of the steps in the methods, and systems disclosed above may be implemented as software (may be realized by program code executable by computing device), firmware, hardware, and suitable combinations thereof. In a hardware implementation, the division between functional blocks/elements mentioned in the above description does not necessarily correspond to the division of physical components; for example, one physical component may have multiple functions, or one function or step may be co-executed by several physical components. Some or all of the components may be implemented as software executed by a processor, such as a central processing unit, a digital signal processor or microprocessor, or as hardware, or as an integrated circuit, such as an application specific integrated circuit. Such software may be distributed on a computer readable medium, which is performed by a computing device, and in some cases, the steps shown or described may be performed in a different order than here, may include computer storage media (or non-transitory media) and communication media (or transitory media). As is well known to those of ordinary skill in the art, the term computer storage medium includes volatile and nonvolatile, removable and non-removable media implemented in any method or technology for storing information (such as computer readable instructions, data structures, program modules or other data). Computer storage media includes, but is not limited to, Random Access Memory (RAM), Read-Only Memory (ROM), Electrically Erasable Programmable Read-Only Memory (EEPROM), flash memory or other memory technology, Compact Disc Read-Only Memory (CD-ROM), digital versatile disc (DVD) or other optical disc storage, magnetic cartridge, magnetic tape, magnetic disk storage or other magnetic storage device, or may any other medium used to store desired information and that can be accessed by a computer. Moreover, it is well known to those of ordinary skill in the art that communication media typically includes computer readable instructions, data structures, program modules, or other data in a modulated data signal, such as a carrier wave or other transport mechanism, and may include any information delivery media. Therefore, this application is not limited to any specific hardware and software combination.

The invention claimed is:

1. An optical line termination (OLT) line card applied to perform compatible communication between a 10G Ethernet Passive Optical Network (10G EPON) and a 10-Gigabit-capable Passive Optical Network (xGPON), comprising a processor, an optical network processing unit and at least one hop-selecting unit;

the processor is configured to:
acquire a first standard signal definition table for a plurality of pins in an optical module corresponding to the 10G EPON and a second standard signal definition table for a plurality of pins in an optical module corresponding to the xGPON;
classify the first standard signal definition table and the second standard signal definition table according to a plurality of functions of the plurality of pins, generate a new standard signal definition table by comparing the differences of signal definitions for the 10G EPON and xGPON optical modules, and enumerate the signals for the pins with the same serial number and different functions for comparison, in case the same pins in the two optical modules have inconsistent signal definitions for enabling different functions, perform signal multiplexing in a new pin definition, and configure a hop-selecting connection in the OLT line card to implement compatibility with the 10G EPON and xGPON optical modules; and
configure the plurality of functions of the plurality of pins of the optical network processing unit based on the new standard signal definition table;

wherein the optical network processing unit is provided with a plurality of pins and configured to transmit an optical network signal; and wherein the hop-selecting unit is configured to control the plurality of pins of the optical network processing unit to output the optical network signal corresponding to the 10G EPON or the optical network signal corresponding to the xGPON according to the type of optical network signal received;

classify the first standard signal definition table and the second standard signal definition table according to a plurality of functions of the plurality of pins comprising:

compare a plurality of definitions of the plurality of pins in the first standard signal definition table and the second standard signal definition table through a one-to-one correspondence of a plurality of serial numbers of the plurality of pins;

classify one or more of the plurality of pins having a same serial number and a same function or one or more of the plurality of pins having a same serial number and corresponding functions not affecting each other as a first type of pin, the first the type of pin having a single function definition; and classify one or more of the plurality of pins having a same serial number and different functions affecting each other as a second type of pin, the second type of pin having at least two function definitions.

2. The OLT line card of claim 1, wherein the hop-selecting unit is a switch chip or a three-terminal gating circuit, and the three-terminal gating circuit is formed by connecting two resistors.

3. A communication control method of an optical line termination (OLT) line card, comprising:

acquiring a first standard signal definition table for a plurality of pins in an optical module corresponding to a 10G Ethernet Passive Optical Network (10G EPON) and a second standard signal definition table for a plurality of pins in an optical module corresponding to a 10-Gigabit-capable Passive Optical Network (xGPON); classifying the first standard signal definition table and the second standard signal definition table according to a plurality of functions of the plurality of pins, wherein classifying the first standard signal definition table and the second standard signal definition table according to a plurality of functions of the plurality of pins comprises: comparing a plurality of definitions of the plurality of pins in the first standard signal definition table and the second standard signal definition table through a one-to-one correspondence of a plurality of serial numbers of the plurality of pins; classifying one or more of the plurality of pins having a same serial number and a same function or one or more of the plurality of pins having a same serial number and corresponding functions not affecting each other as a first type of pin, the first the type of pin having a single function definition; and classifying one or more of the plurality of pins having a same serial number and different functions affecting each other as a second type of pin, the second type of pin having at least two function definitions, and generating a new standard signal definition table by comparing the differences of signal definitions for the 10G EPON and xGPON optical modules, and enumerate the signals for the pins with the same serial number and different functions for comparison, in case the same pins in the two optical modules have inconsistent signal definitions for enabling different functions, perform signal multiplexing in a new pin definition, and configure a hop-selecting connection in the OLT line card to implement compatibility with the 10G EPON and xGPON optical modules; and configuring the plurality of functions of the plurality of pins in the OLT line card based on the new standard signal definition table;

collecting an optical network signal to be input into an optical network processing unit in the OLT line card as well as a switch gating signal corresponding to the optical network signal; and controlling a hop-selecting unit in the OLT line card to gate a pin corresponding to the optical network signal according to the switch gating signal, and outputting the optical network signal to an optical module corresponding to the optical network signal.

* * * * *